(No Model.) 4 Sheets—Sheet 1.
J. W. HYATT.
APPARATUS FOR UPWARD FILTRATION.
No. 417,039. Patented Dec. 10, 1889.
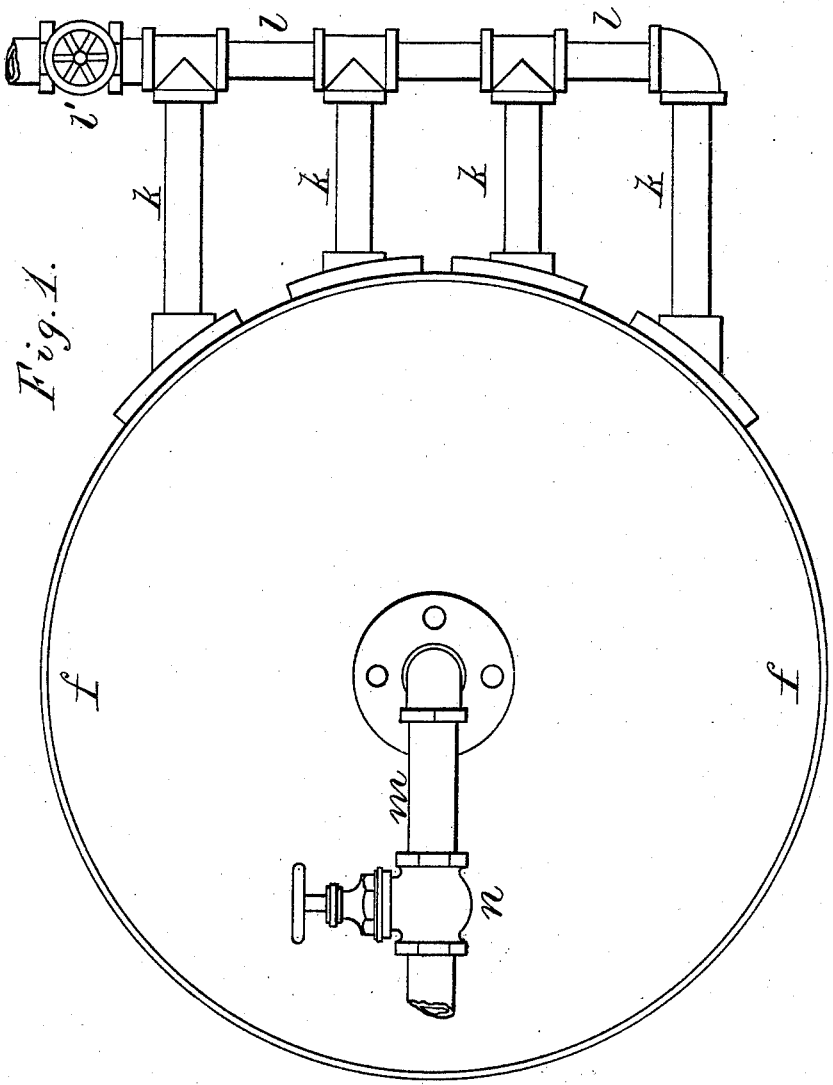
Attest:
L. Lee.
F. C. Fischer.
Inventor.
John W. Hyatt, per
Crane & Miller, Attys.

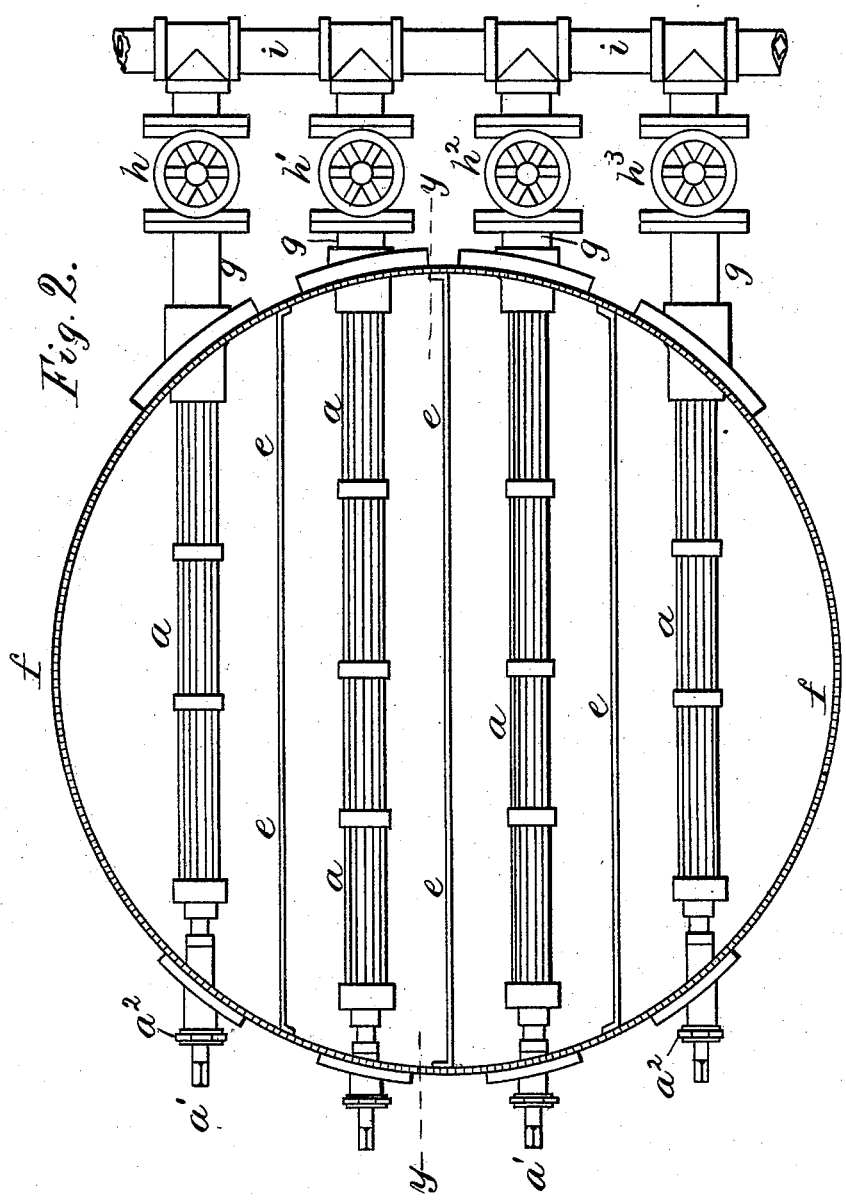

(No Model.) 4 Sheets—Sheet 3.
J. W. HYATT.
APPARATUS FOR UPWARD FILTRATION.
No. 417,039. Patented Dec. 10, 1889.
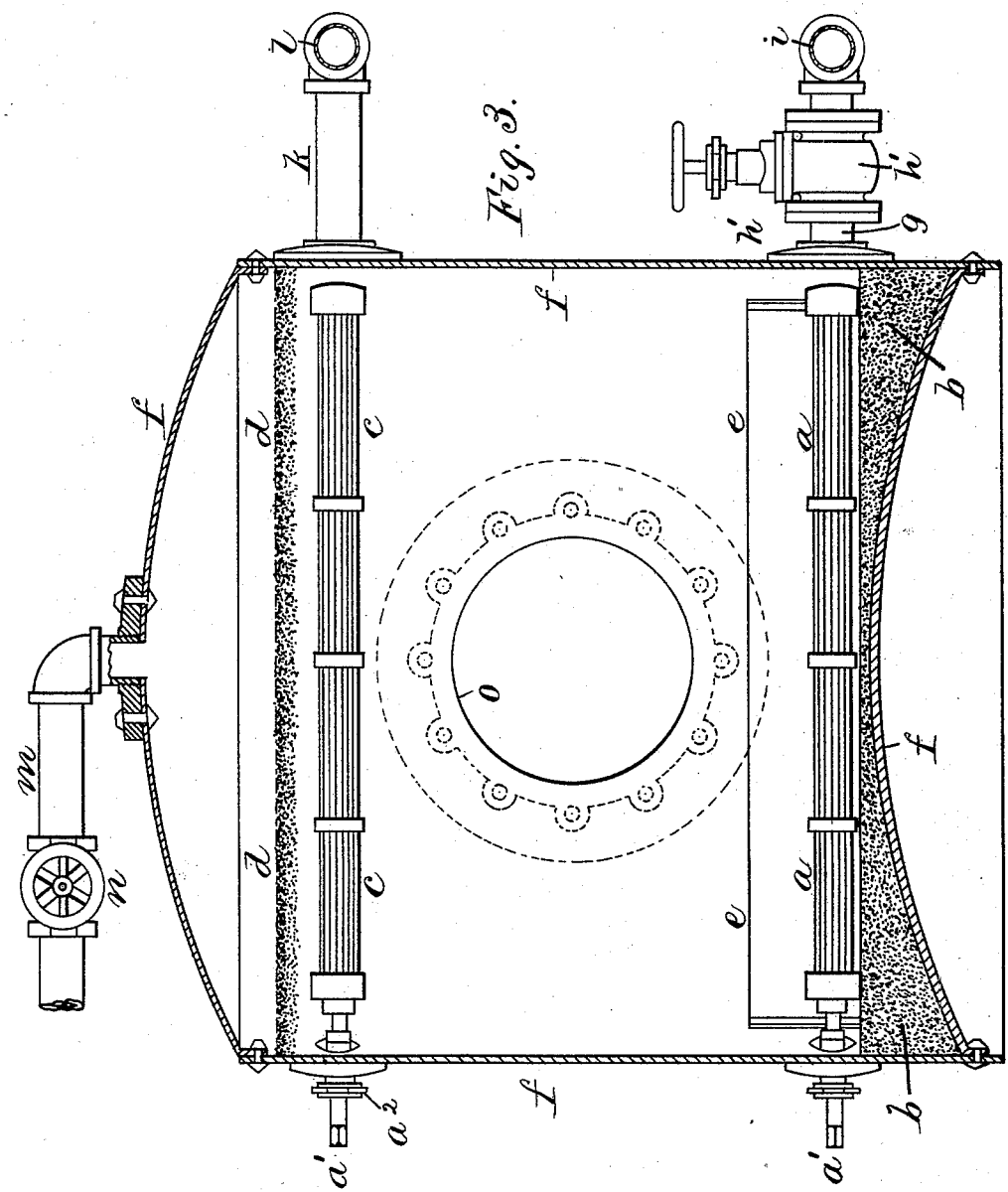
Attest:
L. Lee.
F. C. Fischer.
Inventor.
John W. Hyatt, per
Crane & Miller, Attys.

(No Model.) 4 Sheets—Sheet 4.
J. W. HYATT.
APPARATUS FOR UPWARD FILTRATION.
No. 417,039. Patented Dec. 10, 1889.
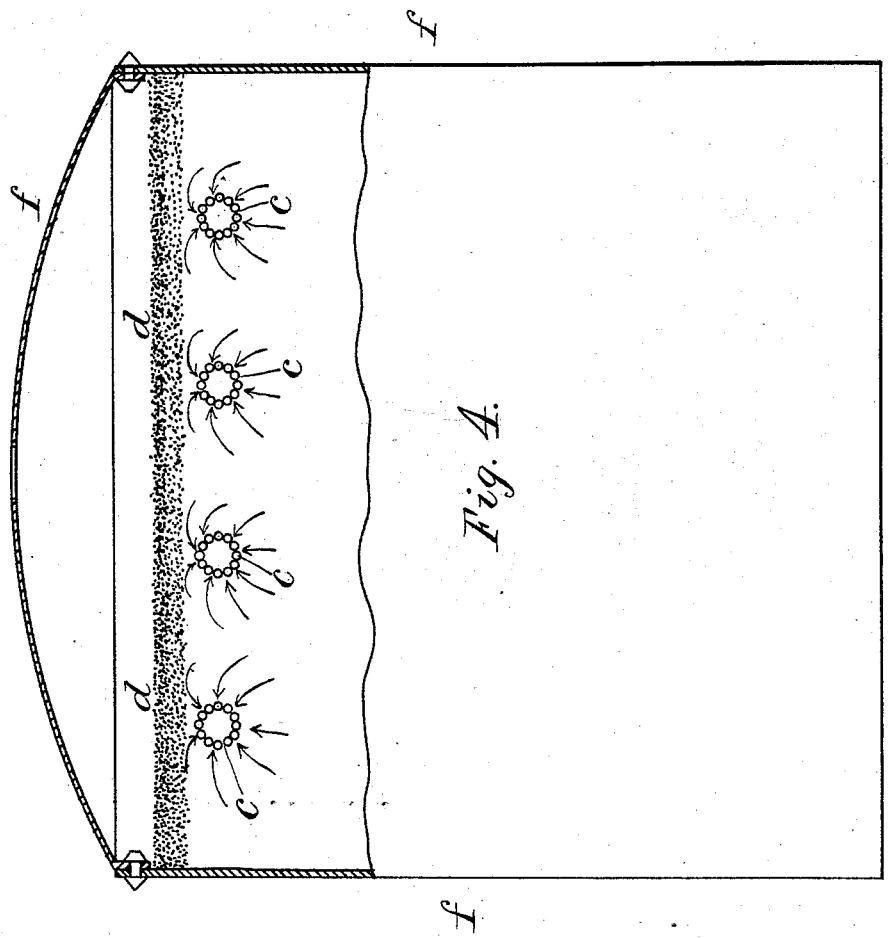

UNITED STATES PATENT OFFICE.

JOHN W. HYATT, OF NEWARK, NEW JERSEY.

APPARATUS FOR UPWARD FILTRATION.

SPECIFICATION forming part of Letters Patent No. 417,039, dated December 10, 1889.

Application filed August 29, 1889. Serial No. 322,319. (No model.)

*To all whom it may concern:*

Be it known that I, JOHN W. HYATT, a citizen of the United States, residing at Newark, Essex county, New Jersey, have invented certain new and useful Improvements in Apparatus for Upward Filtration, fully described and represented in the following specification and the accompanying drawings, forming a part of the same.

The object of this invention is to facilitate the filtration of water by passage upward through a filter-bed without confining the upward portion of the filter-bed to prevent its disturbance.

As a current of water passed upward through a body of granular material is commonly employed in washing a filter-bed to disintegrate its substance and free it from impurities, it it obvious that the filter-bed, to filter rapidly, must be prevented from disintegration if it is intended to perform the filtering functions. By pressing a perforated diaphragm upon the upper surface of the bed it may be prevented from disintegration, and thus adapt it to filter upwardly; but such construction prevents the free disintegration of the bed by an upward current when it is desired to wash the same; and the advantage of my present construction is this, that the upper surface of the bed is not confined during the filtering operation, and may therefore be readily disintegrated when it is desired to cleanse the bed by an upward current.

My improvement consists in the combination, with a filter-bed, of inlet apertures or strainers arranged in or communicating with the lower part of the bed, and outlet apertures or strainers arranged within the filter-bed near the upper surface of the same. By making the bed of suitable depth of the granular materials commonly employed for such purpose the water introduced through the lower strainers may pass upward through the bed and find an outlet through the upper strainers without disturbing the upper surface of the bed or disintegrating the body of the same. During the filtering operation no other outlet would be provided than the upper series of strainers; but when it is desired to wash the bed an outlet-pipe in the upper part of the filter would be freely opened, and the force of the water-current entering the inlet-strainers would then disintegrate the bed as desired, and wash the impurities out through the discharge-pipe above the surface of the same. In such washing operation it is preferable to concentrate the full force of the water-supply upon a portion only of the inlet-strainers to disintegrate and agitate a part only of the filter-bed at one time, and thus cleanse it more thoroughly.

In the drawings, Figure 1 is a plan of the filter, showing only the pipe-connections from the outlet-strainers. Fig. 2 is a plan in section just above the inlet-strainers on line $x\,x$ in Fig. 3, which latter is a vertical section of the filter on line $y\,y$ in Fig. 2. Fig. 4 is an elevation, partly in section, where hatched.

$f$ is the filter-casing.

$a$ are four inlet-strainers inserted horizontally within the casing near the bottom, which is filled with solid material $b$, as hydraulic cement, to the bottoms of the strainers.

$d$ is the upper surface of the filter-bed, near the top of the casing $f$; $c$, the outlet-strainers, inserted horizontally within the bed just below its surface.

$e$ are partitions extended between the inlet-strainers $a$, and projected upward within the filter-bed slightly above such strainers.

$g$ are pipes extended from the several strainers $a$ outside of the casing. $h$, $h'$, $h^2$, and $h^3$ are cocks applied to the same, and $i$ is a header supplying water to all of the said cocks. Pipes $k$ are extended from the outlet-strainers $c$ outside the casing, and a header $l$, having a cock $l'$ at its outlet, connects the pipes $k$ to carry off the filtered fluid.

$m$ is a waste-pipe inserted in the top of the filter-casing and provided with discharge-cock $n$.

A man-hole $o$ is shown in the side of the casing to admit an operator between the two series of strainers for the construction and repairs of the same.

The strainers are shown formed of a bundle of parallel rods, and shafts $a'$, with squares upon their ends for turning the same, are projected from the several strainers through stuffing-boxes $a^2$ upon the casing $f$ to agitate the rods at intervals to prevent the clogging of the fine water-passages between the same, as claimed in my application, Serial No. 321,561, filed August 22, 1889; but any other construction may be used for the strainers, as may be preferred.

In operation the discharge-cock $n$ is closed, the outlet-cock $l'$ from the upper series of strainers is opened, and water is supplied through all the cocks $h$ to the inlet-strainers $a$. The water entering the inlet-strainers then passes upward through the bed and escapes by the strainers $c$ to the outlet pipe or header $l$. The action of the water when thus passing upward through the bed and into the outlet is clearly shown in Fig. 4, (where arrows $s$ are shown directed toward the strainers from the top, sides, and bottom,) but escaping through the same without disturbing the top of the bed. In case any of the water should get up through the top of the bed it would have no means of escape except downward into the bed again adjacent to some of the strainers, and would not therefore operate to disentegrate the bed.

To wash the filter, the cock $l'$ from the header $l$ is closed, preventing the escape of water from the outlet-strainers, and the discharge-cock $n$ is opened. The water entering by one or more of the inlet-strainers is then permitted a free discharge from the filter-casing and passes violently upward through the filter-bed, disintegrating and agitating the same and washing off the impurities through the waste-pipe $m$.

The partitions $e$ are designed for use when washing the bed in sections, as claimed in my application, Serial No. 311,965, filed May 24, 1889, and operate to direct the current of water nearly straight upward through a portion only of the bed when such current is introduced through one strainer only. They form no part of my present invention, as its essential feature is the disposition of the outlet-strainers within the upper part of a granular filter-bed below the surface of the same, the strainers thus discharging the water from the bed without disturbing its upper surface.

It is wholly immaterial what kind of inlets are provided to introduce the pure water into the filter, and any kind of inlets may therefore be arranged in connection with the lower part of the bed.

Having thus set forth my invention, what I claim herein is—

1. The combination, in a filter adapted for upward filtration, of a filter-bed having inlets for introducing water in the lower part of the same, outlet-strainers located within the upper part of the bed below its surface, and an outlet for filtered water connected to such strainers, as and for the purpose set forth.

2. A filter adapted for upward filtration, provided with a filter-bed having inlet-strainers inserted in the lower part of the same, with a supply-pipe for unfiltered fluid connected thereto, a waste-pipe with discharge-cock at the upper part of the filter, outlet-strainers within the upper part of the filter-bed below its surface, and an outlet for filtered water connected with such strainers, and provided with a cock for closing the same during the washing of the filter-bed, substantially as herein set forth.

In testimony whereof I have hereunto set my hand in the presence of two subscribing witnesses.

JOHN W. HYATT.

Witnesses:
THOS. S. CRANE,
F. C. FISCHER.